Patented May 23, 1939

2,159,055

UNITED STATES PATENT OFFICE 2,159,055

PIGMENT TREATMENT PROCESS

Clifford K. Sloan and Gordon D. Patterson, Wilmington, Del., assignors to E. I. du Pont de Nemours & Company, Wilmington, Del., a corporation of Delaware No Drawing. Application June 2, 1937, Serial No. 145,938

9 Claims. (Cl. 134—39)

The present invention relates to pigmented coating compositions and especially to methods for improving the flowing and working properties of said pigmented systems.

Oil systems pigmented with zinc sulfide containing pigments have in many cases been characterized by poor flowing properties and by their marked tendency to set-up to rigid gels on storage. Because of these defects, it was a well-known fact that such systems had unsatisfactory working properties, especially for use in printing inks and paint pastes where the pigment to binder ratio is high. In order to avoid these difficulties it has been proposed to decrease the pigment concentration but this led to a sacrifice in the working properties of such products.

It is an object of the present invention to improve the working properties of coating compositions having as a component a zinc sulfide-containing pigment. A further object is to prevent thickening or livering of systems containing this class of pigments. Still further objects will become apparent from an examination of the herein described invention.

These objects are attained according to the herein described invention which broadly comprises incorporating a guanidine into a zinc sulfide containing pigment or into a composition containing such a pigment.

In a more restricted sense the present invention comprises incorporating into a zinc sulfide containing pigment or into a coating composition containing such pigment a small amount of an agent containing a guanidine nucleus. Thus, an agent containing a guanidine nucleus of basic reaction, an agent containing a substituted guanidine nucleus of basic reaction, e. g., aliphatic hydrocarbon substituted guanidines, an agent containing an aryl guanidine nucleus of basic reaction, etc., may be employed in carrying out the present invention. The preferred agents, however, are the aryl substituted guanidines, particularly the diaryl guanidines. The amount of agent which is added varies between 0.25% to 3.0% based on the pigment present. The manner in which the agent is added to the pigment or pigmented composition is immaterial. Thus, it may be added to the pigment or to the pigmented composition before, during, or after grinding.

In its preferred embodiment the present invention comprises adding to a pigment or pigment composition between about 0.5% to about 1.5% of an agent having a guanidine nucleus. The pigments which are preferred are lithopone, zinc sulfide, and titanium dioxide containing lithopones. The agents having a guanidine nucleus which are preferred are diphenyl guanidine, di-o-tolyl guanidine, and phenyl o-tolyl guanidine. As stated above, various methods may be employed by which the agent is added such as addition to the pigment or to the pigmented composition before, during or after grinding, etc. The compositions having the guanidines incorporated therein are preferably printing ink, paints, and enamels.

The following examples which are given merely for purposes of illustration are not intended to impose limitations of any kind on the herein described invention.

Example I

To 68.5 parts of a commercial, reactive, high oil absorption, lithopone was added 15.8 parts of mineral spirits and 15.8 parts of a heat-bodied linseed oil (acid No. 13) prepared by bodying alkali refined oil in a closed kettle blanketed with $CO_2$ to a viscosity of 3–5 on the Gardner-Holdt scale, and the mixture ground to obtain a good dispersion of the pigment in the vehicle. This grind was duplicated, except that 0.685 part of diphenyl guanidine were included in the mixture. The table below shows the efficacy of the diphenyl guanidine in retarding the bodying of the pigmented composition on storage. A modified Stormer viscometer (as illustrated on page 575 of Gardner's Physical and Chemical Examination of Paints, Varnishes, Lacquers, and Colors; 1935 edition) was used in following viscosity changes in the composition. The apparent viscosity is expressed as the number of seconds required for 100 revolutions of the stirrer, using a 1000 gram weight.

| Days' storage after grinding | Apparent viscosity (secs.) | |
|---|---|---|
| | Without diphenyl guanidine | 1% diphenyl guanidine on pigment |
| 0 | 32 | 27 |
| 1 | 265 | 27 |
| 2 | 328 | 28 |
| 4 | 528 | 26 |
| 7 | 784 | 27 |
| 14 | 1220 | 28 |
| 30 | 1320 | 30 |

Example II

A high oil absorption lithopone, somewhat less reactive than that used in Example A, was mixed with 0.5% of diphenyl guanidine. The treated pigment, when ground in a vehicle containing 65% of a heavy bodied linseed oil and 35% thinner, gives an enamel of improved initial flow and greater stability to thickening on storage.

The improved initial flow was noted by comparison with a similar enamel, but containing untreated pigment. The flow data was obtained by placing ¼ of a teaspoon of paint on a glass slide and then placing the glass slide at a 45° angle, measuring the distance of flow after various time intervals.

| Time of flow | Length of flow | |
| --- | --- | --- |
| | Control | 0.5% diphenyl guanidine |
| | Cm. | |
| 1 min | 3.2 | 7.4 |
| 5 min | 4.6 | 13.3 |
| Final | 7.0 | 14.6 |

The diphenyl guanidine containing enamel was shown to have greater resistance to thickening on storage. The measurement of consistency was made with the modified Stormer viscometer mentioned in Example A. In this case, the comparison was made by noting the weight required to give a constant rate of shear (100 revolutions per 38 seconds).

| Age of enamel | Wt. required for constant shear | |
| --- | --- | --- |
| | Control | ½% diphenyl guanidine |
| | Grams | Grams |
| Fresh | 500 | 450 |
| 2 days | 650 | 450 |
| 1 month | 850 | 450 |

It will be noted that the treated system remained unchanged in body for at least a month, whereas the control showed definite thickening in this same period.

The amount of guanidine to be added in a particular system is largely dependent on the specific surface and oil absorption of the pigment. In the treatment of pigments having high oil absorptions such as titanium containing lithopones and zinc sulfide itself, it may be desirable to add as much as 3.0%, based on the pigment, of the agent. On the other hand, considerably lesser amounts of agent are often sufficient to inhibit the undesired changes in consistency and to impart the desired resistance to livering to the compositions. Thus, the use of 0.25% of guanidine has produced advantageous results. Therefore, while the amount of guanidine which is preferred is between about 0.5% to about 1.5%, it is to be understood that lesser or greater amounts than the preferred 0.5% to 1.5% may be employed without departing from the scope of the herein described invention.

While the pigmented compositions having guanidines incorporated therein are preferably printing inks, paints, and enamels it is to be understood that other compositions such as drying oils, bodied drying oils, varnishes, synthetic resins, drying oil modified alkyd resins, etc., may be treated with guanidine as described herein without departing from the scope of this invention.

As stated above, the method of incorporation of the guanidine with the pigment or with the pigmented composition is immaterial in the practice of this invention. It can be added to the pigment at any of the latter stages during the manufacture of the pigment. Thus, for example, diphenyl guanidine which is only very slightly water soluble can even be added to the water slurry of the pigment prior to filtration. Other methods of incorporation with the pigment include (1) addition to the press cake before drying, (2) addition to the press cake after drying but before pulverizing, and (3) blending with the pulverized pigment. Addition of the guanidine to the pigmented composition itself can be made during mixing or grinding of the same. It can even be added along with non-pigment components of the composition, such as oils, resins, thinners, driers, etc.

By "livering" as used herein it is meant the thickening of the pigmented composition upon aging.

The present invention is of particular advantage in the preparation of printing inks and paint pastes where the pigment to binder ratio is high. The high pigment content of such products tends to make them more prone to flowing and livering difficulties. Improvement in flowing properties and resistance to livering makes it possible to increase pigment concentration without sacrificing working properties. Improved flow and reduced thickening tendency is of importance in the ease with which the paint pastes are reduced with oil although the effect is appreciated in the final paint and enamel system as well.

Having described the present invention the following is claimed as new and useful.

1. A pigmented composition which comprises a zinc sulfide pigment and a guanidine having a basic reaction and sufficient in amount to prevent livering.

2. A pigmented composition comprising a zinc sulfide containing pigment and an anti-livering compound containing a free guanidine nucleus selected from the class consisting of the aliphatic hydrocarbon and aryl substituted guanidines, said guanidines having a basic reaction and sufficient in amount to prevent livering.

3. A pigmented composition comprising a zinc sulfide containing pigment selected from the class consisting of lithopone, zinc sulfide, and titanium dioxide-containing lithopones, and an anti-livering compound containing a free guanidine nucleus selected from the class consisting of the aliphatic hydrocarbon and aryl substituted guanidines, said guanidines having a basic reaction and sufficient in amount to prevent livering.

4. A pigmented composition comprising a zinc sulfide containing pigment selected from the class consisting of lithopone, zinc sulfide, and titanium dioxide-containing lithopones, and between about .25% and about 3.0%, based on the pigment, of an anti-livering compound containing a free guanidine nucleus selected from the class consisting of the aliphatic hydrocarbon and aryl substituted guanidines, said guanidines having a basic reaction.

5. A pigmented composition comprising a zinc sulfide containing pigment and an anti-livering compound containing a free guanidine nucleus selected from the class consisting of diphenyl guanidine, di-o-tolyl guanidine, and phenyl o-tolyl guanidine and sufficient in amount to prevent livering.

6. A pigmented composition comprising a zinc sulfide containing pigment selected from the class consisting of lithopone, zinc sulfide, and titanium dioxide-containing lithopones, and between about .25% and about 3.0%, based on the pigment, of an anti-livering compound containing a free guanidine nucleus selected from the class consisting of diphenyl guanidine, di-o-tolyl guanidine, and phenyl o-tolyl guanidine.

7. A pigmented composition comprising lithopone and diphenyl guanidine, the diphenyl guanidine employed being sufficient in amount to prevent livering.

8. A pigmented composition comprising lithopone and di-o-tolyl guanidine, the di-o-tolyl guanidine employed being sufficient in amount to prevent livering.

9. A pigmented composition comprising lithopone and phenyl o-tolyl guanidine, the phenyl o-tolyl guanidine employed being sufficient in amount to prevent livering.

CLIFFORD K. SLOAN.
GORDON D. PATTERSON.